United States Patent [19]

Thomas

[11] 3,913,936

[45] Oct. 21, 1975

[54] STEERING TRANSMISSION

[75] Inventor: J. Stanley L. Thomas, Concord, Calif.

[73] Assignee: Kelsey-Hayes Company, Oakland, Calif.

[22] Filed: May 28, 1974

[21] Appl. No.: 473,875

[52] U.S. Cl. .............................. 280/91; 180/79.2 C
[51] Int. Cl.² .......................................... B62D 7/14
[58] Field of Search ............... 180/79.2 C, 22, 46; 280/91

[56] References Cited
UNITED STATES PATENTS

| | | | |
|---|---|---|---|
| 1,131,729 | 3/1915 | Neudorff | 280/91 X |
| 1,731,558 | 10/1929 | Wright | 280/91 X |
| 3,075,784 | 1/1963 | Beyerstedt | 180/79.2 C |
| 3,185,245 | 5/1965 | Hoyt | 180/79.2 C |
| 3,414,286 | 12/1968 | Muller et al. | 280/91 |

FOREIGN PATENTS OR APPLICATIONS

| | | | |
|---|---|---|---|
| 1,190,819 | 4/1965 | Germany | 280/91 |

*Primary Examiner*—David Schonberg
*Assistant Examiner*—John A. Pekar
*Attorney, Agent, or Firm*—Warren, Chickering & Grunewald

[57] ABSTRACT

A steering transmission and method is disclosed which may be used with a transporter-loader or similar vehicle having a steering assembly formed for selective shifting to and from crab and regular steering modes. The transmission is formed to sense the positioning of the wheels of the vehicle in a substantially straight-ahead orientation and is formed to prevent shifting between steering modes except in the straight-ahead orientation. The steering transmission is preferably coupled to a mechanical control linkage, which in turn may actuate hydraulic drive means, for angular displacement of the wheels of the vehicle. The transmission preferably includes a gear box having selectively engageable gear elements for steering in different modes and shift prevention means adapted to prevent shifting between modes except in the straight-ahead position.

10 Claims, 11 Drawing Figures

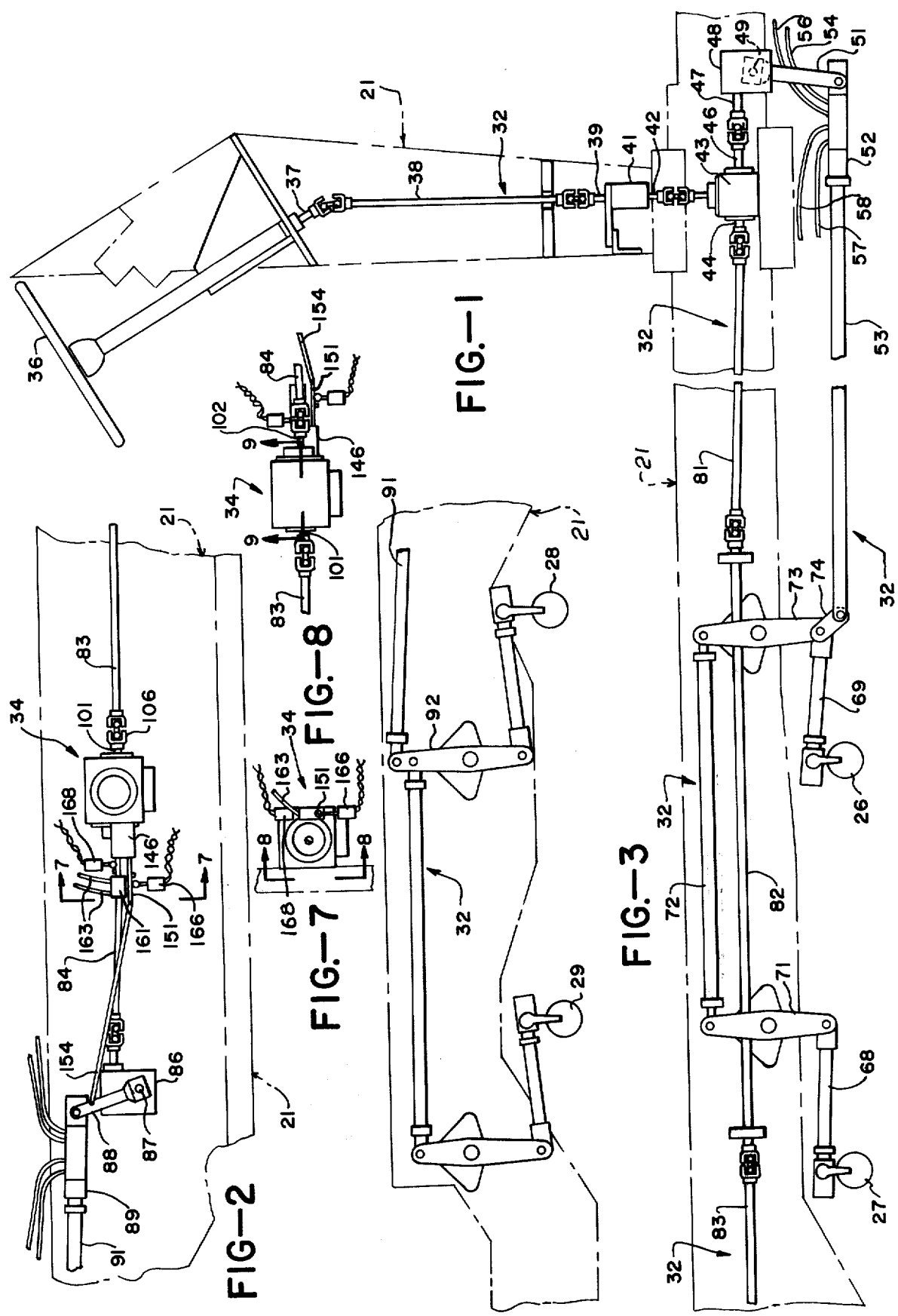

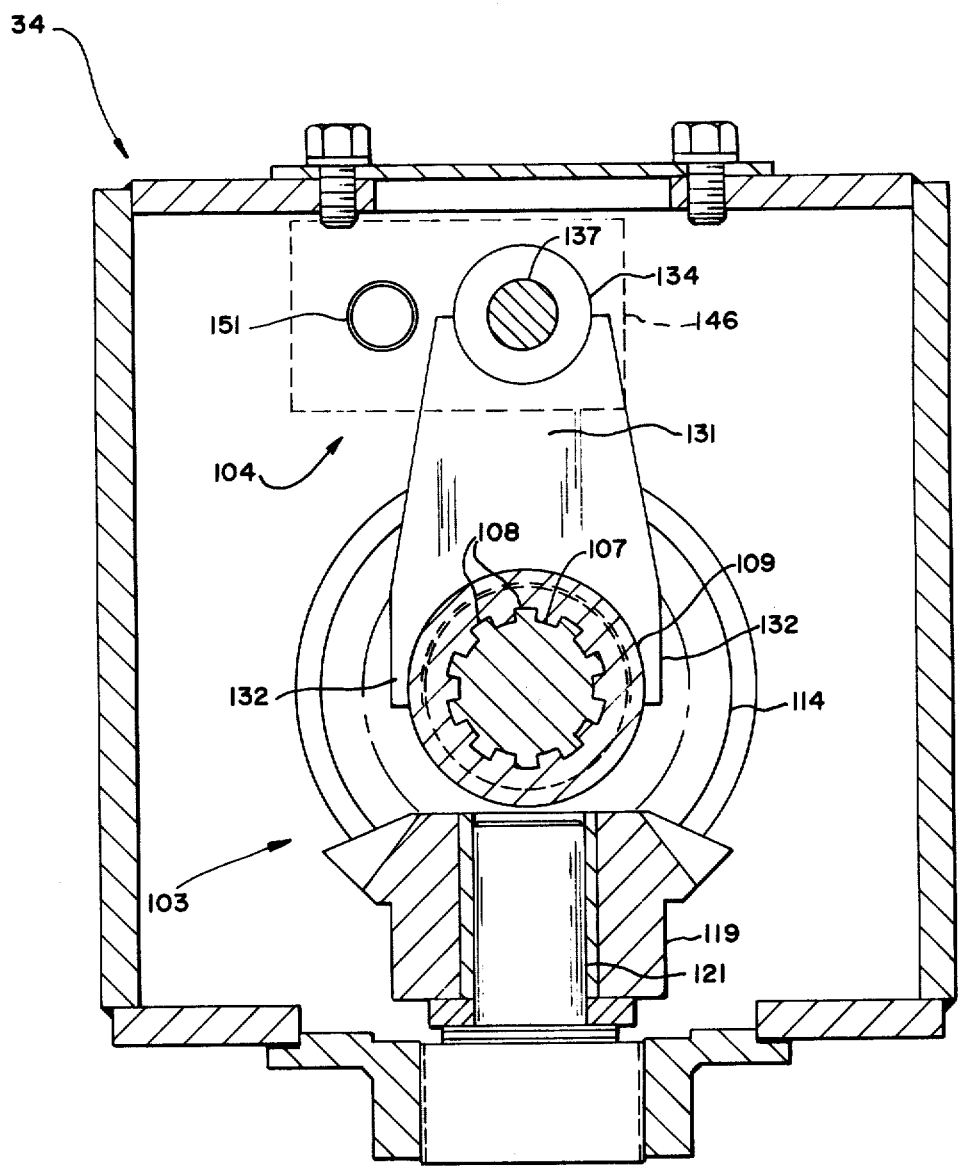
FIG.—10
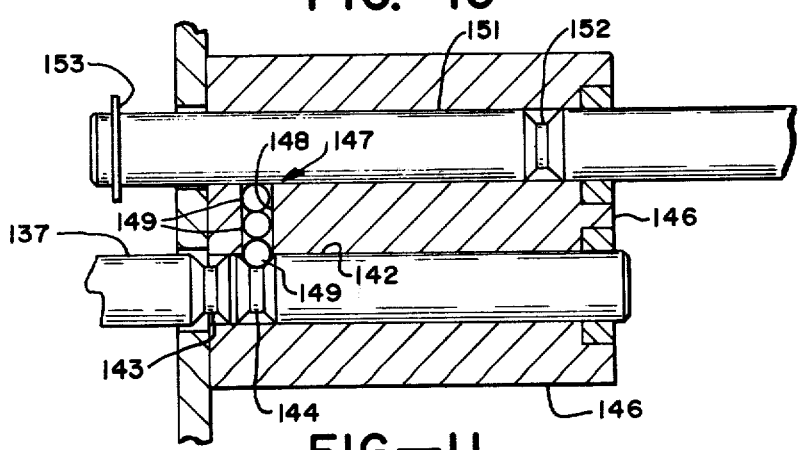
FIG.—11

STEERING TRANSMISSION

BACKGROUND OF THE INVENTION

In various types of large vehicles, and particularly in transporter-loaders of the type used to load airplanes, it is common for the vehicle to include a steering assembly which can be shifted by a steering transmission to and from different steering modes. Usually such vehicles can be shifted between "crab" steering mode and a "regular" steering mode. In crab steering mode the front and rear wheels of the vehicle are angularly displaced in the same direction which allows the vehicle to move laterally in a crab-like motion. Regular steering mode, as used herein, shall include steering in which only the front wheels of the vehicle are steered, and in which both the front and rear wheels of the vehicle may be steered, but the angular displacement of the front and rear wheels is in opposite directions so as to enhance the turning capacity of the vehicle (also more specifically called "coordinated" steering mode).

The incorporation of hydraulic valves which will shift from crab to regular steering modes into large vehicles and more particularly transporter-loaders is well known. In recent years, however, the advent of widebodied jet airplanes has brought to light some substantial deficiencies in prior steering arrangements.

The Boeing 747 passenger airplane can carry a cargo load of approximately 80,000 pounds. The desired turn-around time of these planes engaged in passenger service is approximately 30 to 45 minutes. Prior small transporter-loaders rarely were able to load these planes to more than about one-third of their capacity in the time available. New large transporter-loaders have been developed which can carry a maximum payload of 40,000 pounds, usually in the form of 16 to 18 containers. These transporter-loaders include a lifting and conveying system integrated into the transporter-loader which moves the containers into and out of the aircraft and can rotate or change the order of containers. Two transporter-loaders operating simultaneously can fully load or unload an aircraft in less than six minutes.

In order for these large transporter-loaders to be effective, however, they must be capable of maneuvering into very close proximity with the aircraft. The extreme size and weight of the transporter-loader and its load demand a high precision steering control of the vehicle. Accordingly, crab steering for paralleling sideward motion is necessary at the airplane or when located alongside a loading platform. In order to achieve a short turning radius the coordinated steering mode is preferred.

The size and weight of transporter-loaders necessitates that the steering usually be power boosted to some degree. In prior steering arrangements, it has been possible to shift from crab to a regular steering mode, such as coordinated steering, at virtually any angular orientation of the wheels of the vehicle. This is extermely disadvantageous when employed in a large transporter-loader which is used to load the new widebodied aircraft. A shift from crab to coordinated steering, when the wheels of the transporter-loader are skewed from the straight-ahead position, will result in a substantial angular displacement of the rear wheels of the vehicle as a result of the power boost, even though the vehicle is not moving. This angular displacement of the wheels causes the vehicle to "walk" or shift sideways as the rear wheels turn. Unfortunately, this sideways movement of the transporter-loader can be in the direction of the aircraft, with the result that the massive load of the transporter-loader can be thrust against and damage the aircraft.

Accordingly, it is an object of the present invention to provide a steering transmission for a transporter-loader or similar vehicle which will prevent walking or lateral movement of the vehicle when shifting between steering modes.

It is another object of the present invention to provide a steering transmission for a transporter-loader which enables shifting of the steering mode of the vehicle while in close proximity to aircraft or the like.

It is still a further object of the present invention to provide a steering transmission for a transporter-loader or similar vehicle which is suitable for use in a mechanical or all hydraulic steering system.

It is another object of the present invention to provide a steering transmission for a transporter-loader or similar vehicle which is easy to construct, is durable, is easy to maintain, and has improved safety.

It is still a further object of the present invention to provide a method for controlling the steering of a transporter-loader or similar vehicle which has improved precision, safety, and reliability.

The steering transmission and method of the present invention have other objects and features of advantage, some of which will become apparent from and are set forth in detail hereinafter and in the drawing.

SUMMARY OF THE INVENTION

The steering transmission of the present invention is designed for use with a transporter-loader or similar vehicle having front and rear wheels, and a steering assembly connected to the wheels for controlled movement thereof. The steering transmission is formed for selective shifting of the operation of the steering assembly to and from at least two different steering modes, preferably crab steering and coordinated steering. The improvement of the present invention resides in the steering transmission being formed to sense the positioning of at least one of the front and rear wheels in a substantially straight-ahead orientation and further being formed to prevent shifting of the operation of the steering assembly except when the sensed one of the front and rear wheels is in the straight-ahead orientation. The steering transmission further preferably includes gear means formed for shifting between steering modes and gear shifting means formed to prevent shifting except at the straight-ahead orientation of the wheels of the vehicle. The transmission is readily incorporated into a mechanical control linkage which controls the actuation of hydraulic drive means employed to angularly displace the wheels.

DESCRIPTION OF THE DRAWING

FIG. 1 is a fragmentary, side elevational view of the front end portion of a mechanical control linkage suitable for use with the transmission of the present invention.

FIG. 2 is a fragmentary, side elevational view of a further rearward portion of the linkage of FIG. 1 having a steering transmission constructed in accordance with the present invention incorporated therein.

FIG. 3 is a further fragmentary, side elevational view of the control linkage rearwardly of the portion of the linkage shown in FIG. 2.

FIG. 7 is a fragmentary, end elevational view of the steering transmission of the present invention taken substantially along the plane of line 7—7 in FIG. 2.

FIG. 8 is a fragmentary, side elevational view taken substantially along the plane of line 8—8 in FIG. 7.

FIG. 10 is a cross-sectional view taken substantially along the plane of line 10—10 in FIG. 9.

FIG. 11 is a fragmentary, cross-sectional view taken substantially along the plane of line 11—11 in FIG. 9.

DESCRIPTION OF THE PREFERRED EMBODIMENT

Figure 4:
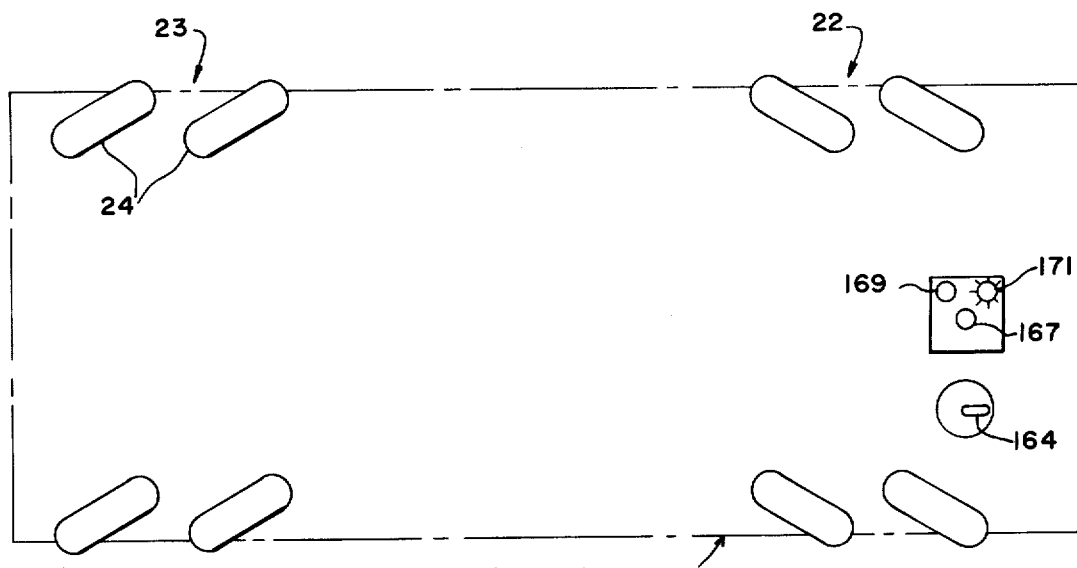
FIG. 4 is a top schematic view of a vehicle with the wheels in coordinated steering mode.

The steering transmission of the present invention can be incorporated into a number of different kinds of vehicles with the only requirement being that the vehicle have a steering assembly (usually more than one steerable axle) that can be selectively operated in at least two different steering modes. Accordingly, in FIGS. 1–6, vehicle 21 is shown schematically in phantom lines. The schematic representation of vehicle 21, however, closely approximates the overall outline of a transporter-loader of the type suitable for loading and unloading widebodied jet aircraft, which is the preferred use of the transmission.

When heavy loads are to be transported, the vehicle usually will be constructed with a set of front wheels, generally designated 22, and a set of rear wheels, generally designated 23. Each set of wheels is comprised of two pairs of wheels 24 which are mounted on independent axles 26–29 and have a steering assembly portion 31 associated with each axle. Lighter vehicles would be constructed with a single axle and pair of wheels at each of the front and rear sets of wheels 22 and 23.

The steering assembly of the vehicle is connected to the front and rear wheels for controlled movement thereof to effect angular displacement of wheels 24 during steering. As shown in the drawing, the steering assembly includes the steering linkage 31 associated with each axle and a control linkage, generally designated 32, interrelating and controlling the steering of the front and rear sets of wheels. It will be understood, however, that in the broadest aspect of the present invention, a mechanical control linkage 32 is not necessary since the steering assembly can alternatively include hydraulic control means interrelating the movement of the front and rear sets of wheels. Even when the mechanical control linkage 32 is employed, associated hydraulic drive means, generally designated 33, comprises a portion of the overall steering assembly, as will be set forth in detail hereinafter.

Figure 5:
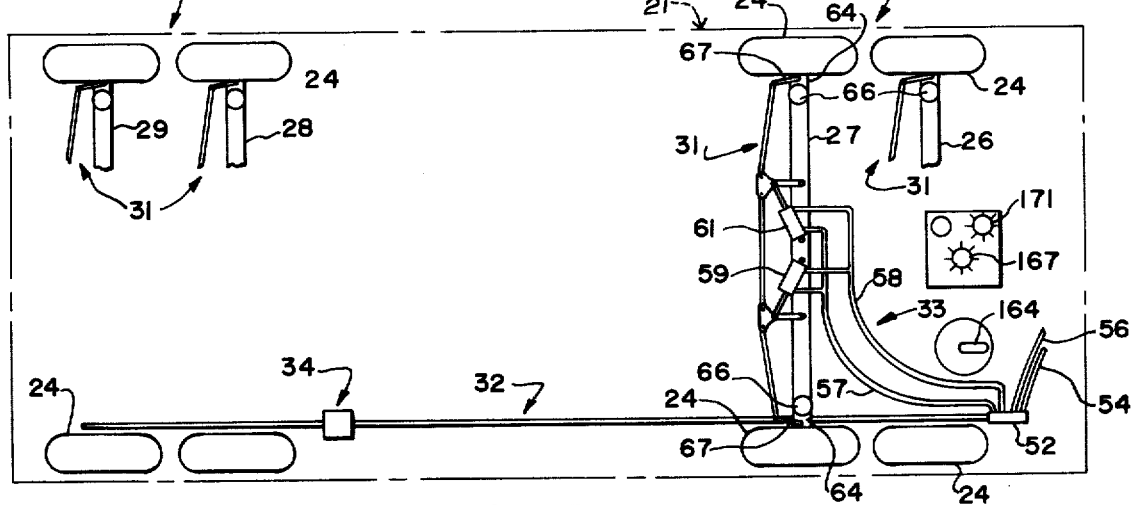
FIG. 5 is a top schematic view of a vehicle with the wheels in straight-ahead position.

When a mechanical control linkage 32 is employed as part of the steering assembly, the steering transmission of the present invention, generally designated 34, can be incorporated or interposed in the mechanical control linkage, preferably operatively between front wheels 22 and rear wheels 23, as is shown schematically in FIG. 5. When the steering assembly includes hydraulic steering control means, the steering transmission could be incorporated into and form a part of the hydraulic controls for steering of the wheels.

Although mechanical control linkage 32 is not regarded by itself as being a part of the present invention, a more detailed description of the same and the manner in which steering is controlled is helpful to an understanding of the preferred form of the present transmission. Referring to FIG. 1, steering wheel 36 will be seen to be mounted in a conventional fashion in the cab of the vehicle on rotatable shaft 37. Shaft 37 is coupled to vertical shaft 38, which in turn is coupled to a shaft 39 extending into a power boost means 41 formed to assist the driver in steering the vehicle. Extending out of power boost means 41 is a shaft 42 which in turn is coupled to a beveled gear box 43 having a rotatable output shaft 44 leading to the rear wheels of the vehicle and a second rotatable output shaft 46 leading to the portion of the mechanical linkage which controls the front wheels 22 of the vehicle.

In order to reduce the mechanical effort, shaft 46 is coupled to a rotatable shaft 47 which extends into reduction box 48. The reduction box normally includes a worm gear or the like which is used to drive a gear mounted on shaft 49 to which arm 51 is keyed for movement upon rotation of shaft 49. It is preferred that reduction box 48 effect about a 26 to 1 reduction.

Pivotally mounted to the end of arm 51 is a hydraulic control valve 52. Control valve 52 is constructed in a standard manner with spring means and a hydraulically centered spool for flow of hydraulic fluids from pump to tank when the spool is in the centered postion. Fluid is directed from the pump to steering cylinders 59 and 61 (FIG. 5) and from the steering cylinders back to tank. Thus, conduit 54 connects valve 52 to the pump (not shown) and conduit 56 connects the valve to tank (not shown); and conduit 57 connects valve 52 to the right steering ends of cylinders 59 and 61 and conduit 58 connects valve 52 to the left steering ends of the steering cylinders (FIG. 5). A ligher vehicle may not require two such steering cylinders per axle.

Mounted to extend from control valve 52 is an extension rod 53 which in turn is connected to lever 73 through link 74. Lever 73 is connected to a steering arm portion 67 of spindle assembly 64 on axle 27 by link 72, lever 71 and link 68. Wheels 24 are mounted for rotation on spindles 64, and the spindles are in turn mounted for arcuate turning movement on king pins 66. Connecting linkage 31 extends between the spindle assemblies 64 at each end of each axle, and as will be seen in FIG. 2, link 69 connects lever 73 to spindle assembly 64 on axle 26.

Rotation of steering wheel 36 to the right results in wheel angular movement to the right, with proportional movement of the wheels being determined by the described mechanical linkage. If the loads on the wheels result in resisting forces exceeding the spring biasing of control valve 52, the valve will be extended and direct hydraulic fluid to and from cylinders 59 and 61 in a manner assisting in steering or reducing the steering effort required. Rotation of the steering wheel to the left will result in a similar reaction but in an opposite direction. When the loads on the wheels are relatively light, the spring biasing force in valve 52 is not overcome and valve 52 does not act to cause the flow of hydraulic fluid to the steering cylinders. Steering is then effected through levers 71 and 73, which are actuated through extension rod 53 and are connected to spindle assemblies 64, as above described.

Shaft 44 also turns in response to movement of steering wheel 36, and this motion is transmitted through end-to-end connected shafts 81, 82 and 83, which latter shaft is coupled at 106 to input shaft 101 of steering transmission 34. Extending outwardly of transmission 34 is output shaft 102 which is coupled by coupler 105 to shaft 84 for control of the aft reduction box 86, which serves the same function as gear box 48. Output shaft 87 of the reduction box is connected by arm 88 to a control valve 89. The aft steering assembly includes extension rod 91, lever 92 and linkages to the aft axles analogous to those described in connection with the fore axles.

Figure 6:
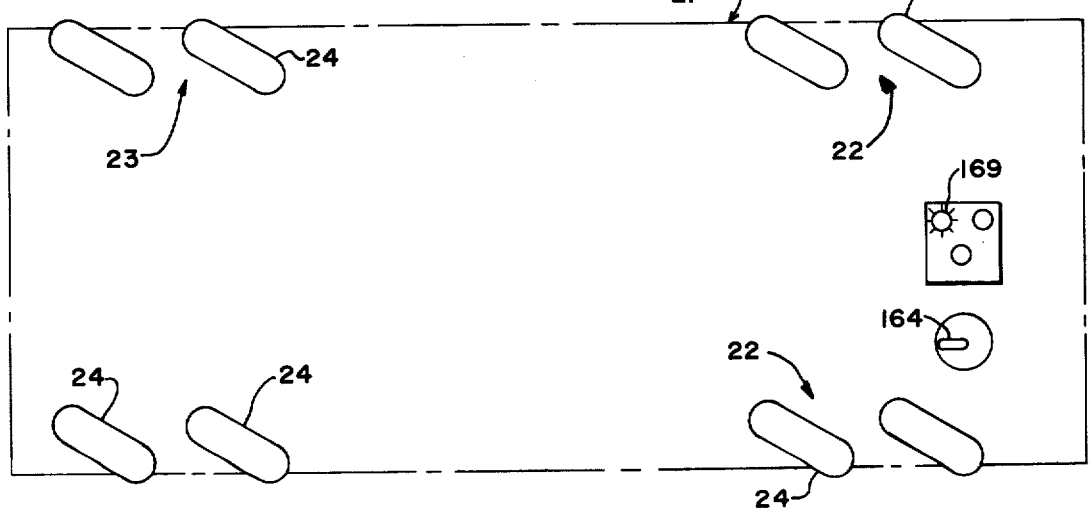
FIG. 6 is a schematic representation of a top plan view of a vehicle with the wheels in crab steering mode.

Although shaft 83 will rotate in a direction opposite to that of shaft 46, this corresponds to the same clockwise or counter clockwise input into reduction boxes 48 and 86. If steering transmission 34 is shifted so that shaft 84 rotates in the same direction as the shaft 83, in the particular arrangement that is illustrated, the reduction box arm 88 will be displaced in the same direction as arm 51, resulting in coordinated steering as shown in FIG. 4. The control valve 89 is constructed in the same manner as spool valve 52 and hydraulically connected so that the rear wheels will be displaced in the direction corresponding to the mechanical signal provided. If the steering transmission 34, however, is shifted to reverse the direction of rotation of shaft 84, then arm 88 will move in a direction opposite to that of arm 51, and the rear wheels would be angularly displaced in a direction corresponding to that of the front wheels, which would be crab steering mode as shown in FIG. 6. Essentially, therefore, the function of steering transmission 34 is to selectively vary the direction of rotation of shaft 84 in the mechanical control linkage from a direction corresponding to the direction of rotation of shaft 83 to a direction opposite to that of the direction of rotation of shaft 83.

If the rear wheels were not to be steered, as is the case in a conventional car, transmission 34 would have a position in which output shaft 84 would not rotate. In this type of configuration, the steering transmission would be formed to sense the presence of the front wheels in the straight-ahead position, rather than the rear wheels, as shown in FIG. 2 and as will be set forth in detail hereinafter.

Figure 9:
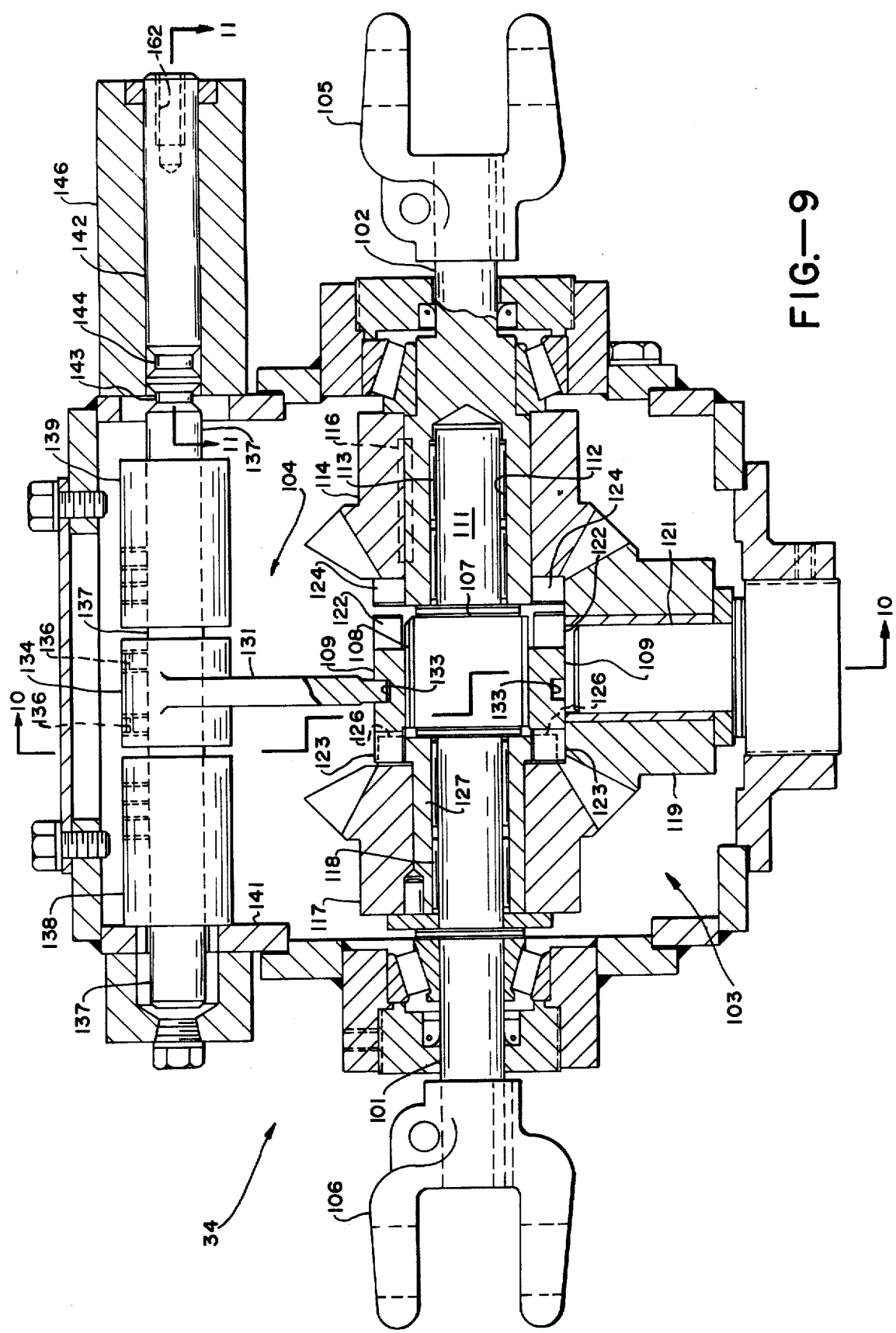
FIG. 9 is an enlarged, cross-sectional view taken substantially along the plane of line 9—9 in FIG. 8.

Referring now to FIGS. 9, 10 and 11, the construction of a steering transmission of the type preferred for use in a transporter-loader having a mechanical control linkage can be described in detail. Initially, it should be noted that FIG. 9 is a cross-section taken off of FIG. 8, which has steering transmission 34 reversed in direction from that shown in FIG. 2. Thus, shaft 83 is coupled by coupler 106 to an input shaft 101 while shaft 84 is coupled by coupler 105 to an output shaft 102 of steering transmission 34.

The steering transmission includes gear means, generally designated 103, formed for mounting to the steering assembly of the transporter-loader with the gear means operatively interposed therein, and gear shifting means, generally designated 104, connected to move gear means 103 for shifting of the transmission only upon positioning of the wheels of the transporter-loader in a straight-ahead orientation.

In order to prevent shifting between steering modes at all positions of the wheels of the vehicle except in the parallel straight-ahead orientation, gear shifting means 104 is formed and connected to move gear means 103 to and from the positions corresponding to crab and regular steering modes by an arm 131 having a bifurcated end 132 (best seen in FIG. 10) which is slideably mounted in annular recess 133 in shifting element 109. Arm 131 is fixedly secured to collar 134 which is secured by set screws 136 for movement with shaft 137 in order to effect shifting of the shifting element. Shaft 137 is mounted for axial reciprocation and carries collars 138 and 139, which are pinned to the shaft and act as stops limiting reciprocation of shaft 137. For example, the collar 138 is shown in engagement with shoulder 141 on the transmission housing in FIG. 9, limiting reciprocation of the shaft further to the left.

The control of reciprocation of shaft 137 and accordingly shifting of shifting element 109 is accomplished at extension portion 142 of shaft 137, as best may be seen in FIGS. 9 and 11. A pair of side-by-side recesses 143 and 144 are formed in the extension 142 of rod 137. Since shifting element 109 and rod 137 move axially together as a unit, recesses 143 and 144 can be considered as being formed in a portion of the shifting element. As will be seen best in FIG. 11, the body 146 of the transmission housing into which portion 142 of shaft 137 extends, carries interlocking means, generally designated 147, which is comprised of a bore 148 and a plurality of spherical members 149.

In order to prevent shifting of shaft 137, spherical members 149 are formed to have a combined dimension along bore 148 in excess of the length of bore 148 and less than the combined length of bore 148 and the depth of recesses 143 and 144. As best may be seen in FIG. 11, the endmost sphere 149 is forced to protrude into recess 144. As long as the sphere is held in recess 144, it is not possible to shift shaft 137 and accordingly element 109.

In order to enable shifting of shaft 137, however, a control rod 151 is provided and is mounted adjacent shaft 137 in body portion 146 of the transmission. Control rod 151 is also preferably formed with a recess 152 and is mounted for reciprocation along the axis of the control rod in body portion 146. In this regard, washer element 153 is provided to limit axial reciprocation out of body portion 146. As will be apparent from FIG. 11, control rod 151 can be reciprocated until recess 152 is in alignment with bore 148 containing the interlocking spheres 149. Upon such registration of recess or groove 152 with spheres 149, the spheres can be displaced toward control rod 151, which in turn frees shaft 137 to be shifted between grooves 143 and 144. As shown in FIG. 11, shaft 137 could be shifted to the right upon alignment of groove 152 with bore 148.

Referring now to FIG. 2, control rod 151 can be seen to be coupled to a linkage 154, which in turn is coupled to arm 88. Accordingly, displacement of arm 88 in response to angular displacement of the wheels, in this case the rear wheels, will displace linkage 154 and control rod 152. The length of linkage 154 and the positioning of groove 152 in control rod 151 can be easily selected to cause groove 152 to be aligned with bore 148 and interlocking spheres 149 only when the rear wheels are in the straight-ahead orientation. For all other orientations of the rear wheels, the control rod 151 will urge or reciprocate spheres 149 into one of the two recesses 143 and 144, locking shaft 137 and the transmission against shifting.

It is preferred to effect shifting of the transmission by providing power means 161 (FIG. 2) which is connected to end 142 of shaft 137 at threaded connection 162 (FIG. 9). The power means 161 can be a pneumatically driven device having pneumatic conduits 163 and being controlled from the cab of the vehicle by steering transmission shifting lever or switch 164 (FIG. 4). For ease of use by the operator, it is further desirable to provide switch means 166 which is formed to sense alignment of groove 152 with the interlocking spheres and indicate such alignment in the cab at light 167 (FIG. 5), and switch means 168 which senses the positioning of shaft 137 in either the crab steering mode, as shown by light 169 (FIG. 6), or regular or coordinated steering mode as shown by light 171 (FIG. 4).

The details of the construction and operation of gear means 103 in effecting a change in the direction of rotation of output shaft 102 to effect shifting between crab and coordinated steering modes can now be described. Input shaft 101 is provided with an enlarged section 107 having splines 108 which key and hold a shifting element 109 for rotation with input shaft 101. Mounted on an extension 111 of shaft 101 is output shaft 102, which is formed with a recess or bore 112 therein for receipt of extension 111. Bearing means 113 is positioned between input shaft extension 111 and output shaft 102 so that the output shaft rotates freely of the input shaft. Gear means 103 further includes a first gear element 114 mounted to output shaft 102 by a key or spline 116 for rotation of the first gear element with the output shaft. A second gear element 117 is mounted about shaft 101 with bearing means 118 interposed therebetween for free rotation of second gear element 117 with respect to shaft 101. In order to interconnect first and second gear elements, gear means 103 further preferably includes an idler gear element 119 mounted on shaft 121 and mounted in engagement with the first and second gear elements. Shaft 121 is substantially perpendicular to shafts 101 and 102, as is commonly employed in a beveled gear box, and idler gear 119 is mounted for free rotation on shaft 121.

Shifting element 109 is mounted to the splined portion of shaft 101 for reciprocation along splines 108 in a direction axially of shafts 101 and 102. Additionally, shifting element 109 is provided with a pair of protrusions or ears 122 extending toward first gear element 114 and a second pair of ears or protrusions 123 which extend toward second gear element 117. Shaft 102 is formed with mating recesses or slots 124, as is sleeve 127, which includes slots 126 facing ears or protrusions 123 of the shifting element. As shown in FIG. 9, the shifting element has been shifted axially for engagement of ears 123 with recesses 126. the recesses 126 are shown as provided in a portion of a collar 127 to which beveled gear 117 is fixedly mounted.

Operation of the gear means to shift between crab and coordinated steering modes (which latter is the regular steering mode for most transporter-loaders) can be set forth. Rotation of shaft 83 causes input shaft 101 to be rotated, which in turn rotates shifting element 109. As shown in FIG. 9, the shifting element is shifted to the left with ears 123 engaging slots or recesses 126 and causing second gear element 117 to rotate in the same direction as shafts 101. Since idler gear 119 engages second gear element 117, the idler gear is driven and in turn drives first gear element 114 in a direction opposite to that of shaft 101. The second gear element is keyed by key 116 to shaft 102 which is in turn coupled by coupler 105 to rotatable shaft 84. Thus, with shifting element 109 in the position as shown in FIG. 9, the output shaft will move or rotate in a direction opposite to that of the direction of movement or rotation of shaft 101. It should be noted that shaft 102 is free to rotate with respect to extension portion 111 of shaft 101, which would be rotating in an opposite direction.

If shifting element 109 is shifted to the right, ears 122 will engage recesses 124 in first gear element 114 causing the first gear element and output shaft 102 to rotate in the same direction as input shaft 101. Idler gear 119 will be driven by first gear element 114, but it simply will cause second gear element 117 to rotate freely about and in a direction opposite to the direction of rotation of shaft 101.

As will be apparent from FIG. 9, shifting element 109 is adapted for shifting directly to and from a first position in which shaft 102 rotates in the same direction as shaft 101 and a second position (shown in FIG. 9) in which shaft 102 rotates in an opposite direction. This shifting occurs without passing through a neutral position, i.e., a position at which shifting element 109 would not engage either of the first or second gear elements. Ears 123 and 122 are dimensioned so that the shifting element is at all times in engagement with at least one of the sets of recesses 124 and 126. The transporter-loader, therefore, is always shifted in either a crab steering or coordinated steering mode.

As is apparent, however, it would be possible to dimension the ears on shifting element 109 and the length of splined portion 107 of shaft 101 so that the shifting element could be shifted to a neutral position. This approach might be used, for example, if it were desired to steer only the front wheels of the vehicle. If, in accordance with the present invention, shifting were only possible when the rear wheels were in the straight-ahead position, shifting to the neutral position wold result in the rear wheels being maintained in the straigtahead position with only the front wheels being steered. Since the front wheels would be the only wheels being angularly displaced in such a regular steering mode, the transmission should be connected to sense positioning of the front wheels at the straight-ahead orientation.

The operation of the transmission and the shift preventing means can now be described. Assuming for the purpose of illustration that the vehicle is in coordinated steering mode as shown in FIG. 4, the shift lever 164 is in a forward position and light 171 is on. As the wheels are displaced to the straight-ahead orientation, arm 88 of the mechanical control linkage causes, through linkage 154, control rod 151 to be reciprocated until groove 152 aligns with the interlocking spheres 149. At this point sensing switch 166 senses the presence of the rear wheels in the straight-ahead position and light 167 is lighted. Since the transmission has not been shifted, light 171 is also still on. The operator may then shift lever 164 to the down position shown in FIG. 6 which actuates pneumatic power means 161 to apply a force to shaft 137 tending to urge the same in a direction causing shifting of element 109. The beveled construction of recesses or grooves and 144 will cause the spheres to be reciprocated toward and into recess 152 upon application of an axial force to shaft 137. When shifting is completed, light 169 will come on in the cab indicating that the vehicle is in crab steering mode. The operator may then turn the wheels of the vehicle which will displace groove 152 from alignment with bore 148, either to the right or to the left of the bore, depending upon the direction of turning. Again, the beveled nature of groove 152 urges locking spheres 149 toward shaft 137 to lock the same in one of the two grooves and permit shaft 151 to be reciprocated either to the right or to the left.

The procedure is reversed when shifting from crab to coordinated steering, and in each case the transmission prevents such shifting except in the straight-ahead orientation of the wheels. Thus, "walking" or sideways displacement of the vehicle as a result of shifting between steering modes does not occur when the transmission of the present invention is employed.

It should be noted that since it is impossible to shift between modes except when the wheels are in the straight-ahead orientation, the operator will normally back away from the plane or loading dock before straightening out the wheels and shifting.

It should also be noted that should the operator shift lever 164 before the indicator light 167 comes on the transmission will still be locked against shifting until the straight-ahead position is reached, at which point the transmission will shift between modes.

As is apparent, alternate embodiments of the present invention can be employed to accommodate the special needs of the steering assembly being controlled. Thus, specific requirements in the control linkage may dictate attendant changes in the steering transmission. Indicator lights and the like are advantageous, but optional. Hydraulic power means can be used to effect shifting, as can mechanical linkages. Sensing of the straight-ahead orientation can be accomplished off the front wheels and the steering transmission located closer to the front wheels. In each case, the method of controlling the steering is the same and involves sensing of the positioning of the wheels of the vehicle in the straight-ahead orientation and preventing shifting of the steering between modes for all positions of the wheels except the straight-ahead orientation.

What is claimed is:

1. In a steering transmission for use with a transporter-loader or similar vehicle having a steering assembly including a mechanical control linkage formed for selective operation of a set of front wheels and a set of rear wheels in a crab steering mode and at least one regular steering mode, said linkage further including a rotatable input shaft operatively connected to one set of said wheels and a rotatable output shaft operatively connected to a second set of said wheels, said steering transmission including gear means formed for mounting to said steering assembly with an input side thereof connected to said input shaft and an output side thereof connected to said output shaft, and said steering transmission including gear shifting means formed for connection to said steering assembly and formed to sense the positioning of the wheels of said transporter-loader in a substantially parallel straight-ahead orientation, the improvement comprising:

said gear means further including:
  i. a shifting element operatively connected to said gear shifting means and mounted to one of said input shaft and said output shaft for rotation therewith;
  ii. a first gear element mounted to the remainder of said input shaft and said output shaft for rotation therewith;
  iii. a second gear element mounted for rotation freely of both said input shaft and said output shaft; and
  iv. an idler gear element mounted in engagement with said first and second gear elements for transmission of power therebetween;

said first gear element and said second gear element each being formed for engagement by said shifting element, and said shifting element being formed for axial movement along the shaft on which it is mounted to and from a first position operatively connected said wheels for movement in a crab steering mode and a second position operatively connecting said wheels for movement in a regular steering mode, said shifting element engaging said first gear element in said first position for rotation of said first gear element and the shaft on which said first gear element is mounted in the said direction as said shaft on which said shifting element is mounted, and said shifting element engaging said second gear element in said second position for rotation of said second gear element in the same direction as said shifting element, and through said idler gear element, for rotation of said first gear element and said shaft on which said first gear element is mounted in a direction opposite to the direction of motion of said shaft on which said shifting element is mounted, said gear shifting means being further formed and connected to move said shifting element to and from said first position and said second position only when the wheels of said transporter-loader are in said straight-ahead orientation.

2. A steering transmission as defined in claim 1 wherein,
  said shifting element is adapted for shifting directly to and from said first and said second positions without passing through a neutral position.

3. A steering transmission as defined in claim 1 wherein,
  said first gear element, said second gear element and said idler gear element are all bevel gears with said second gear element being mounted for free rotation about and with respect to the axis of said shaft on which said shifting element is mounted, and said idler gear element being mounted on a shaft substantially perpendicular to said input and said output shafts.

4. A steering transmission as defined in claim 3 wherein,
  said shaft on which said shifting element is mounted is the input shaft to said transmission and the remaining shaft is the output shaft, and said input shaft extends into a recess formed in said output shaft, and said input shaft is mounted for free rotation in said recess with respect to said output shaft.

5. A steering transmission as defined in claim 1 wherein,
  said gear shifting means includes a control rod connected to a portion of said steering assembly controlling the angular displacement of at least one of said set of front wheels and said set of rear wheels, said control rod being displaceable with angular movement of the set of wheels to which said control rod is connected, and shift prevention means engaging said shifting element and said control rod and adapted to prevent shifting of said shifting element for all positions of said control rod except when said control rod is displaced to a predetermined position corresponding to said straight-ahead position of said set of wheels to which said control rod is connected.

6. In a steering transmission for use with a transporter-loader or similar vehicle having a steering assembly including a mechanical control linkage formed for selective operation in a crab steering mode and in at least one regular steering mode, said steering transmission including gear means formed for mounting to the steering assembly of said transporter-loader with said gear means operatively interposed therein, said gear means being fromed for selective movement to and from a first position operatively connecting the wheels of said transporter-loader for movement in a crab steering mode and to and from a second position operatively connecting the wheels of said transporter-loader for movement in a regular steering mode, the improvement comprising:

said gear shifting means for connection to said steering assembly and including: (i) a control rod formed for connection to a portion of sid steering assembly controlling the angular displacement of ata least one of a front set of wheels and a rear set of wheels, said control rod being displaceable with angular movement of the set of wheels to which said control rod is connected, ii. a shifting element movable to cause shifting of said gear means to and from said first and second positions, and iii. shift prevention means coupled to said shifting element and said control rod and adapted to prevent shifting of said shifting element for all positions of said control rod except when said control rod is displaced to a predetermined position corresponding to said straight-ahead position of said set of wheels to which said control rod is connected.

7. A steering transmission as defined in claim 6 wherein, said shift prevention means is comprised of a recess in said control rod, a pair of side-by-side recesses in said shifting element, and an interlocking means mounted for reciprocation with respect to said control rod and said shifting element, said interlocking means being adapted for selective urging into and out of said recesses in said shifting element and said recess in said control rod and being adapted and mounted to be held in one of said recesses in said shifting element for all positions along the length of said control rod except at said recess in said control rod and being dimensioned for reciprocation out of said recesses in said shifting element upon registration of said recess in said control rod with said interlocking means to permit shifting of said shifting element, said groove in said control rod being positioned to register with said interlocking means upon orientation of said wheels in said straight ahead position.

8. A steering transmission as defined in claim 7 wherein, said grooves in said control rod and shifting means are beveled along the direction of movement of the same, said interlocking means is formed as a plurality of spherical members, and said shift prevention means includes a bore opening at one end to said shifting element and at an opposite end to said control rod, said spherical members being mounted in said bore and having a combined dimension along said bore in excess of the length of said bore and less than the combined length of said bore and the depth of said recesses.

9. A steering transmission as defined in claim 7 wherein, said gear shifting means further includes power means formed to shift said shifting element upon registration of said groove in said control rod with said interlocking means.

10. In a steering transmission for use with a vehicle having front and rear wheels, and a steering assembly connecting said front and rear wheels for controlled movement thereof, said steering assembly includes a mechanical control linkage formed and connected to said front and rear wheels for angular displacement thereof and coupled to the steering wheel of said vehicle, said linkage including rotatable elements and being formed for rotation of said rotatable elements through a multiplicity of rotataions to effect full angular displacement of said wheels, said steering transmission being formed for coupling to said rotatable elements of said linkage and formed with gear means adapted for selective shifting of the operation of said steering assembly to and from at least two different steering modes, the improvement comprising:

gear shifting means operatively connected to said gear means and including means to sense the angular orientation of the wheels of said vehicle independently of the rotation of said rotatable elements and to permit shifting of said gear means to and from said different steering modes only when the wheels of said vehicle are in a straight-ahead position.

* * * * *

UNITED STATES PATENT OFFICE
CERTIFICATE OF CORRECTION

PATENT NO. : 3,913,936
DATED : October 21, 1975
INVENTOR(S) : J. Stanley L. Thomas It is certified that error appears in the above-identified patent and that said Letters Patent are hereby corrected as shown below:

Column 8, line 66, between the words "grooves" and "and" insert the numeral --143--.

Signed and Sealed this fourth Day of May 1976

[SEAL]

Attest:

RUTH C. MASON
Attesting Officer

C. MARSHALL DANN
Commissioner of Patents and Trademarks